United States Patent [19]
Nam

[11] Patent Number: 5,913,012
[45] Date of Patent: Jun. 15, 1999

[54] DECODING METHOD AND DECODER OF A D-VHS CODEC SYSTEM

[75] Inventor: Seung-Hyun Nam, Kyeongki-Do, Rep. of Korea

[73] Assignee: Daewoo Electronics Co., Ltd., Seoul, Rep. of Korea

[21] Appl. No.: 09/000,877

[22] Filed: Dec. 30, 1997

[30] Foreign Application Priority Data

Dec. 31, 1996 [KR] Rep. of Korea ................... 96-80869

[51] Int. Cl.$^6$ .................................................. H04N 5/92
[52] U.S. Cl. ........................... 386/124; 386/111; 386/112
[58] Field of Search .................................. 386/111, 112, 386/109, 124, 95, 98, 68, 123, 40; 360/32, 48; H04V 5/92

[56] References Cited

U.S. PATENT DOCUMENTS

| | | | |
|---|---|---|---|
| 5,465,181 | 11/1995 | Yoshinaka | 386/124 |
| 5,682,457 | 10/1997 | Woo et al. | 386/95 |

FOREIGN PATENT DOCUMENTS

| | | |
|---|---|---|
| 0 548 887 A2 | 6/1993 | European Pat. Off. . |
| 0 548 887 A3 | 6/1993 | European Pat. Off. . |
| WO 94/28546 | 12/1994 | Japan . |
| 2 284 495 | 12/1994 | United Kingdom . |

OTHER PUBLICATIONS

"JVC Unveils HM–DSR100 D–VHS Digital Satellite Recorder", *Victor Company of Japan, Ltd.*, 1996, 4 pages.
"JVC Finalizes Technical Specifications of D–VHS Standard (STD) Mode", *Victor Company of Japan, Ltd.*, 1996, 2 pages.
"Basic Technical Specifications of D–VHS Standard (STD) Mode", *Victor Company of Japan, Ltd.*, 1996, 1 page.
"What is Bit Stream Recording?", *Victor Company of Japan, Ltd.*, 1996, 1 page.
"What is IEEE 1394 Digital Interface?", *Victor Company of Japan, Ltd.*, 1996, 1 page.
"Features of Digital Broadcasts", *Victor Company of Japan, Ltd.*, 1996, 1 page.
"D–VHS Applications", *Victor Company of Japan, Ltd.*, 1996, 1 page.
"The Evolution of VHS", *Victor Company of Japan, Ltd.*, 1996, 1 page.

*Primary Examiner*—Huy T Nguyen
*Attorney, Agent, or Firm*—Pillsbury Madison & Sutro LLP

[57] ABSTRACT

A decoding method and a decoder of a D-VHS codec system for recording/reproducing a high-definition picture and a high-fidelity sound is disclosed. In the playback of the digital data which is recorded in the format of the track, a decoding method and a decoder of the D-VHS codec system correct the random error or the burst error by the forward error correction addition information and reproduce both a high-definition picture and a high-fidelity sound. Consequently, an enormous quantity of computation which cannot be processed by programs, is performed in real time by an optimal data flow operation process method and the compressed or processed digital data is processed at a high speed. Also, a hardware configuration of the codec which conventionally includes two or three pieces of circuit board implements one custom-made semiconductor chip and cuts a unit cost of the manufacturing of the D-VHS codec.

16 Claims, 14 Drawing Sheets

DECODING METHOD AND DECODER OF A D-VHS CODEC SYSTEM

BACKGROUND OF THE INVENTION

1. Field of the Invention

The present invention relates to a decoding method and a decoder of a digital-video home system codec system for recording/reproducing a high-definition picture and a high-fidelity sound.

2. Description of the Prior Art

Since digital television broadcasts have begun to be on the air using MPEG2 (Moving Picture Experts Group 2) in 1994, many broadcasting companies all over the world are putting the digital broadcasts into operation or plan to put it into operation before long. The reason broadcasting companies participate in the digital broadcasts is that digital data has a trifling loss of information and provides both a high-quality moving picture and a high-fidelity sound, and that digital information has a compatibility which is well-suited for the multimedia age. At this time, many overseas electronics manufacturers anticipate the marketability of a digital data recorder (hereinafter, referred to as "DR") while they intensively invest their money in the development of DR's.

Victor Company of Japan, Ltd. (JVC) has finalized the technical specifications of a Digital-Video Home System (hereinafter, referred to as "D-VHS") Standard (STD) mode. Standardization of the specifications was achieved after consultation with Hitachi, Ltd., Matsushida Electric Industrial Co., Ltd. and Philips Electronics N.V. regarding D-VHS, which was announced in April of 1995. This paves the way for D-VHS technology to be incorporated in products, further advancing VHS as a recording medium in the upcoming multimedia age.

D-VHS is a new technology which is based on VHS, the world's most popular home video format. In addition to offering the features of the conventional VHS, to address the needs of multimedia applications, this new VHS technology offerers bit stream recording capability which will allow recording of compressed digital data such as digital broadcasts. By making the most of the advantages of tape media—namely high capacity and low cost—expectations are that D-VHS can be used in new applications, including in an in-home digital data storage device.

The digital broadcast has the video/audio characteristics of multichannel, high picture quality, surround sound, multilingual and so on. Also, in the aspect of information, the digital broadcasts are divided into service information such as program lists and commentaries, and data broadcasts such as PC softwares, shopping catalogs and electronic publishing. Technology which offers both recording and reproducing of a large quantity of diversified information is essential in the rapidly-progressing multimedia age. FIG. 1 is a block diagram for showing a schematic circuit configuration of a system for recording/reproducing digital broadcast data by a conventional D-VHS. As shown in FIG. 1, an audio/video signal which is supplied from a camera 11 is converted into a digital signal by an analog-to-digital converter 12 in a broadcasting station. The audio/video signal which is converted into a digital signal passes through a digital compressor 13 and is processed by a digital picture compression process such as the MPEG2. The compressed signal is QPSK (Quadrature Phase Shift Keying)-modulated by a modulator 14 and is propagated via a broadcast satellite 15. The digital broadcast data which is received by a broadcast receiving antenna 16, sequentially passes through a tuner 171 and a demodulator (not shown) and becomes a demultiplexed digital data. The demultiplexed digital data passes through an IEEE1394 digital interface and is provided to an input port of a D-VHS system 18 in the form of bit stream. The bit stream is recorded, in the format of a track, on a tape which is loaded on a deck (not shown) of D-VHS system 18.

In playback, the digital data which is read out from the tape passes through the IEEE1394 digital interface and is processed by a digital expander 172. The digital data from digital expander 172 passes through a digital-to-analog converter 173 and is provided to a television receiver 19.

Namely, bit stream recording is a method of recording compressed or processed, e.g., encrypted, signals such as those of digital broadcasts on a tape directly as digital data, and outputting them in the same state as they were input.

Therefore, a bit stream recording unit does not incorporate functions like analog-to-digital conversion, digital-to-analog conversion, digital compression/decompression or descrambling. Thus, video and audio signals cannot be reproduced using that unit alone. To reproduce the video and audio signals, the bit stream data must pass through a digital broadcast receiver's circuits that convert the digital data to video and audio signals.

Also, the D-VHS has the following characteristics. Firstly, in addition to analog recording of current broadcasting systems such as NTSC or PAL, timeshifting of digital broadcasts by bit stream recording is possible. Secondly, by offering the high-capacity characteristics of tape media, data recording in step with the multimedia age is possible. Thirdly, by maintaining compatibility with the current VHS format, playback of the vast VHS software library existing worldwide is possible. Fourthly, by utilizing most of the conventional VHS technology, parts and production facilities, widespread penetration and development for home use is possible.

The D-VHS has the recording capability of storing digital data for up to 7 hours at the input data rate of 14.1 [Mbps]. In a long play mode, the D-VHS has the recording capability of storing digital data for up to about 14 hours at the input data rate of 7 [Mbps]. Namely, the D-VHS has the recording capability of 44 [gigabytes]. The D-VHS is applicable to video servers, security recorders, data loggers, data storages and so on.

In step with the rapidly-progressing multimedia age, it is required to develop a decoding method and a decoder of a D-VHS codec system which performs an enormous quantity of computation in real time and has a low unit cost of manufacturing in order to store compressed information such as digital broadcast data in high capacity and to reproduce a high-definition picture and a high-fidelity sound.

SUMMARY OF THE INVENTION

Therefore, it is a first object of the present invention to provide a decoding method of the D-VHS codec system which, in the playback of the digital data which is recorded in the format of the track, corrects the random error or the burst error by the FEC (hereinafter, referred to as "FEC") addition information and reproduces both a high-definition picture and a high-fidelity sound.

It is a second object of the present invention to provide a decoder of the D-VHS codec system which, in the playback of the digital data which is recorded in the format of the track, corrects the random error or the burst error by the FEC addition information and reproduces both a high-definition picture and a high-fidelity sound.

In order to achieve the first object, the present invention provides a decoding method of a D-VHS codec system, which comprises the steps of:

(i) detecting both a sync pattern and a format of data in each of tracks of digital data having the format of a train of bits and being read from a tape loaded in a deck, and generating sync-pattern-detected data;

(ii) dividing the sync-pattern-detected data generated in step (i) into sync blocks while storing the data in the sync block of unit, and classifying an ID included in a header of each of the sync blocks;

(iii) performing an error correction of the classified ID generated in step (ii) on the basis of whether or not the classified ID is damaged, and generating a corrected ID;

(iv) descrambling a read data in the sync block of unit by using the corrected ID generated in step (iii) as an initial value while reading out data in the sync block of unit stored in step (ii), and generating a descrambled data;

(v) storing on a firstly-predetermined number of local memory banks both main data sync blocks and subcode sync blocks respectively configured in the format of the track in the descrambled data generated in step (iv), and generating a deformatted sync block data;

(vi) recording the deformatted sync block data generated in step (v) in a relevant track of a memory in accordance with a recording control signal in synchronization with a system clock on the basis of an address of the memory computed by the value of the ID of the deformatted sync block data;

(vii) judging whether or not the deformatted sync block data is sequentially recorded in step (vi) up to a secondly-predetermined number of tracks;

(viii) deshuffling the sync blocks of the deformatted sync block data newly recorded in step (vi) when it is judged in step (vii) that the deformatted sync block data is completely recorded in a relevant track, and executing both an inner decoding and an outer decoding in order to generate both an error position information and an error magnitude information of each of the sync blocks;

(ix) storing in sequence both the error position information and the error magnitude information of each of the sync blocks generated in step (viii) in positions, assigned thereto, of error information register;

(x) judging whether or not a playback stop signal is in an enable state;

(xi) storing only a normal sync block data among read sync block data equivalent to error-corrected sync block data when it is judged in step (x) that the playback stop signal is not in the enable state;

(xii) transmitting a normal sync block data having a controlled point of a transmission time to a set-top box based on a relative time interval of a transport stream packet entered when the normal sync block data is recorded on the tape while reading out the normal sync block data stored in step (xi); and (xiii) stopping a playback operation when it is judged in step (x) that the playback stop signal is in the enable state.

In order to achieve the second object, the present invention provides a decoder of a D-VHS codec system, which comprises:

a sync pattern detector for dividing a preamble, a subcode and a main code of each of tracks of digital data having the format of a train of bits and being read from a tape loaded in a deck, and for detecting sync data in the subcode and the main code, in order to provide both sync-pattern-detected data and information related to a format thereof;

a depacketizer for dividing to store the sync-pattern-detected data from the sync pattern detector in the sync block of unit based on the information related to the format of sync-pattern-detected data from the a sync pattern detector, for providing a read data in the sync block of unit and for classifying an ID included in a header of each of the sync blocks, in order to provide a classified ID;

an ID corrector for judging whether or not the classified ID from the depacketizer is damaged, and for providing a corrected ID by executing an error correction of the classified ID when an error occurs;

a descrambler for descrambling the read data in the sync block of unit from the depacketizer by using the corrected ID from the ID corrector as an initial value, and for providing a descrambled data;

a byte aligner for storing on local memory banks both main data sync blocks and subcode sync blocks respectively configured in the format of the track in the descrambled data from the descrambler, and for providing a deformatted sync block data;

a memory for sequentially recording the deformatted sync block data in a relevant track thereof in accordance with a recording control signal in synchronization with a system clock on the basis of an address thereof computed by the value of an ID included in the deformatted sync block data from the byte aligner;

a data controller for allocating a time for each device to access the memory during the recording of data or when receiving a request for reading out data, and for arbitrating data requirements colliding with each other;

a memory controller for providing both a recording/readout address of a memory location and a recording/readout control signal in order to record or read out the data onto/from the memory under the control of the data controller;

a deshuffler for deshuffling the sync blocks for an error correcting coding from the tracks having the sync block data recorded therein when the data controller judges that the sync block data included in a predetermined number of tracks is completely recorded in a relevant track of the memory, and for providing deshuffled sync blocks;

an RS decoder for sequentially executing an inner decoding and an outer decoding in the sync block of unit with respect to the deshuffled sync blocks from the deshuffler, and for providing an error position information and an error magnitude information of each of the sync blocks;

an error information register for sequentially storing in assigned positions both the error position information and the error magnitude information of each of the sync blocks from the RS decoder;

a latch for storing a firstly-read sync block data in an order of the track and the sync block while reading out error-corrected sync block data via the data controller by requesting the data controller to provide the error-corrected sync block data recorded on the memory after the error correction is completed when the data controller judges that a playback stop signal is in an inactive state, and for outputting a secondly-read sync block data;

a dummy filter for excluding dummy sync block data from the secondly-read sync block data from the latch, and for providing only normal sync block data;

a desmoothing buffer for storing the normal sync block data from the dummy filter in synchronization with the switching signal under the control of the data controller;

a time stamp comparator for comparing a time stamp of each of the sync block data with a present reference time stamp data while reading the time stamp of the normal sync block data read out from the desmoothing buffer, and for controlling a point of a data transmission time to a set-top box; and a microcontroller for providing subcode data and system data to said data controller.

In a decoding method and a decoder of a D-VHS codec system according to the present invention, an enormous quantity of computation which cannot be processed by programs, is performed in real time by an optimal data flow operation process method, and the compressed or processed digital data is processed at a high speed.

BRIEF DESCRIPTION OF THE DRAWINGS

The above objects and other advantages of the present invention will become more apparent by describing in detail a preferred embodiment thereof with reference to the attached drawings, in which.

DESCRIPTION OF THE PREFERRED EMBODIMENT

A description will be given below in detail with reference to accompanying drawings to a configuration and an operation of a decoding method and a decoder of a D-VHS codec system according to an embodiment of the present invention.

Figure 1:
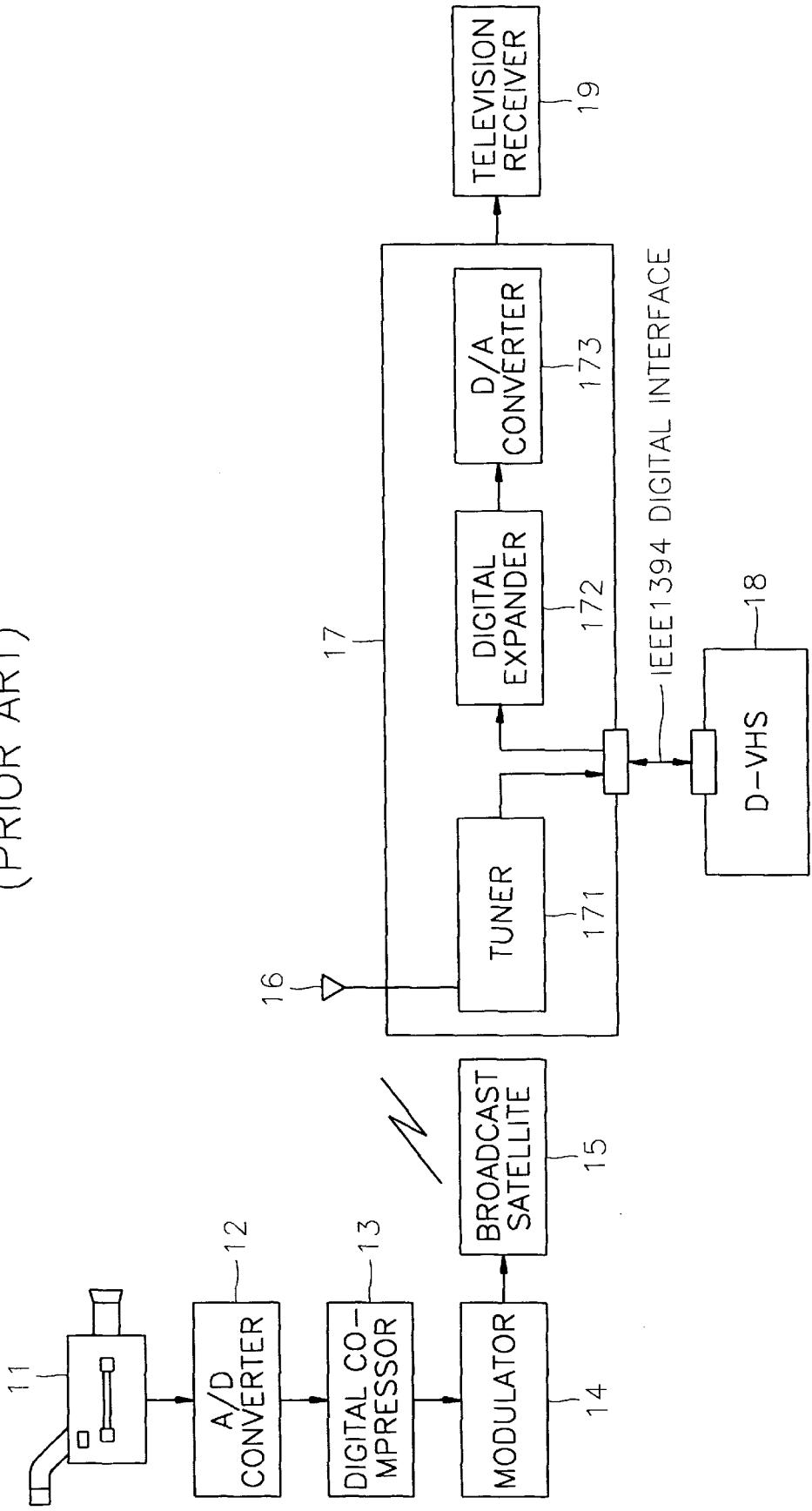
FIG. 1 is a block diagram for showing a schematic circuit configuration of a system for recording/reproducing digital broadcast data with a conventional D-VHS.
Figure 2:
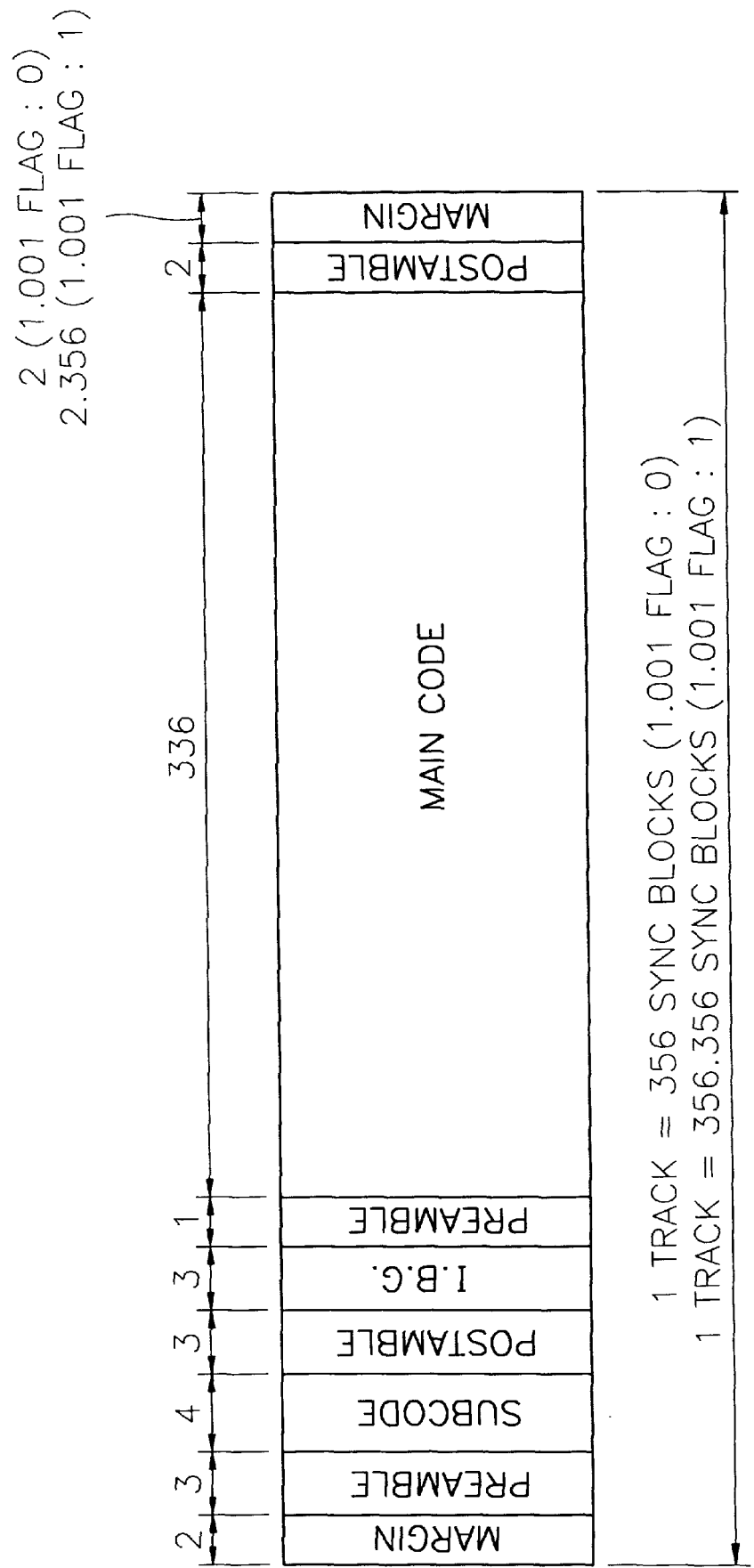
FIG. 2 is a view for showing a structure of one track which is applied to a recording data structure in a basic format of a D-VHS system standard.

FIG. 2 is a view for showing a structure of one track which is applied to a recording data structure in a basic format of a D-VHS system standard. As shown in FIG. 2, a track consists of 356 sync blocks. However, when 1.001 flag in Format ID is set to 1, a track consists of 356.356 sync blocks. Each of sync blocks is composed of 896 bits. A main code area consists of main data sync blocks. A subcode area consists of subcode sync blocks. One sync block consists of 4 subcode sync blocks.

Figure 3:
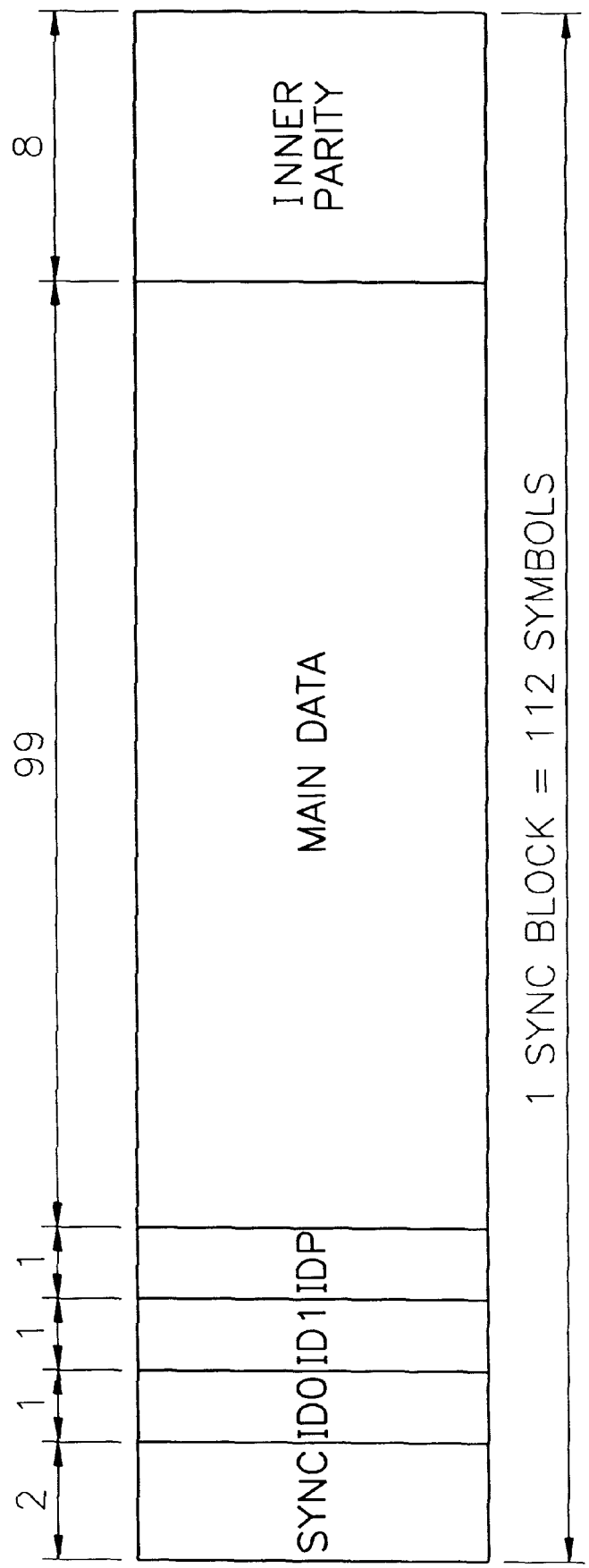
FIG. 3 is a view for illustrating a structure of one main data sync block which is included in a main code of one track shown in FIG. 2.

FIG. 3 is a view for illustrating a structure of one main data sync block which is included in a main code of one track shown in FIG. 2. As shown in FIG. 3, the main data sync block consists of a sync, an ID, a main data and an inner parity. One main data sync block has 99 symbols of Main data and 8 symbols of Inner parity. One symbol is composed of 8 [bits].

The Sync stands for a boundary which divides sync blocks. The ID consists of ID0, ID1 and IDP. The ID0 and ID1 respectively stands for a number of a track to which a sync block belongs and a position of the sync block in a relevant track. The IDP is an error detection code for the ID0 and the ID1.

Figure 4:
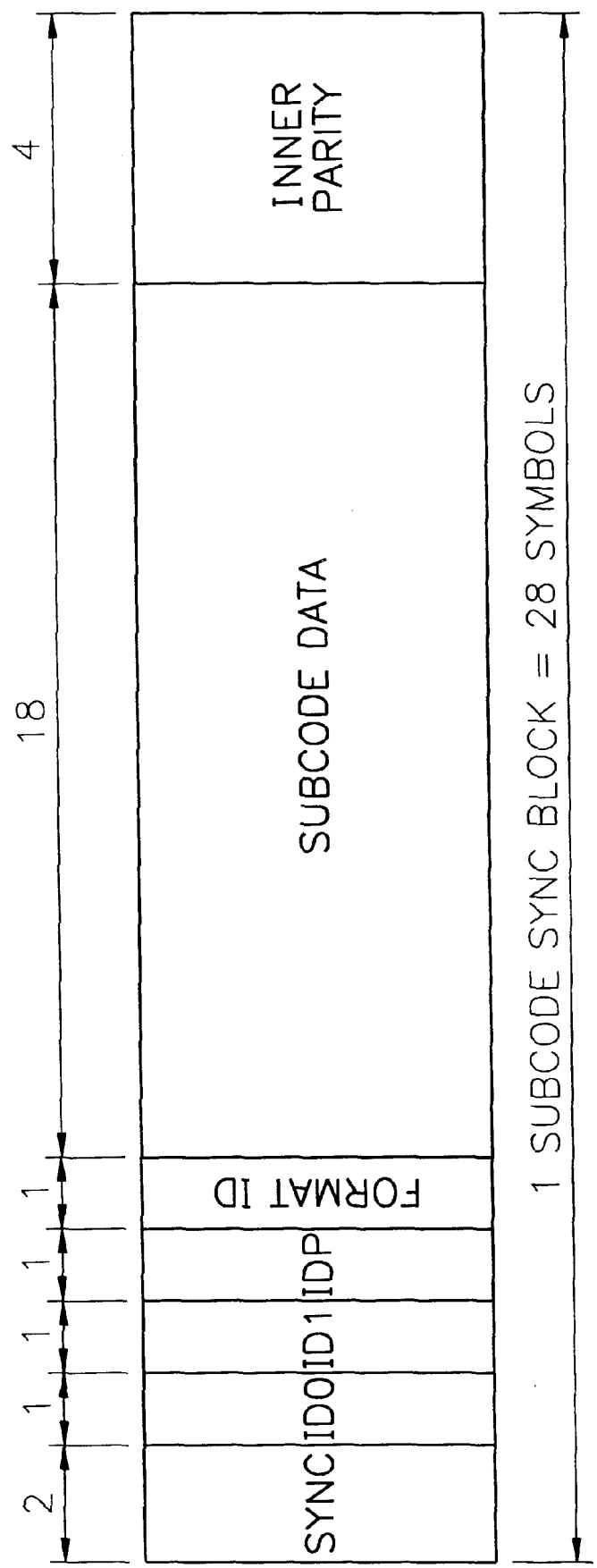
FIG. 4 is a view for illustrating a structure of one subcode sync block which is included in a subcode of one track shown in FIG. 2.

FIG. 4 is a view for illustrating a structure of one subcode sync block which is included in a subcode of one track shown in FIG. 2. As shown in FIG. 4, the subcode sync block consists of a sync, an ID, a format ID, a subcode data and an inner parity. One subcode sync block has 18 symbols of Subcode data and 4 symbols of Inner parity. One symbol is composed of 8 bits.

Figure 5:
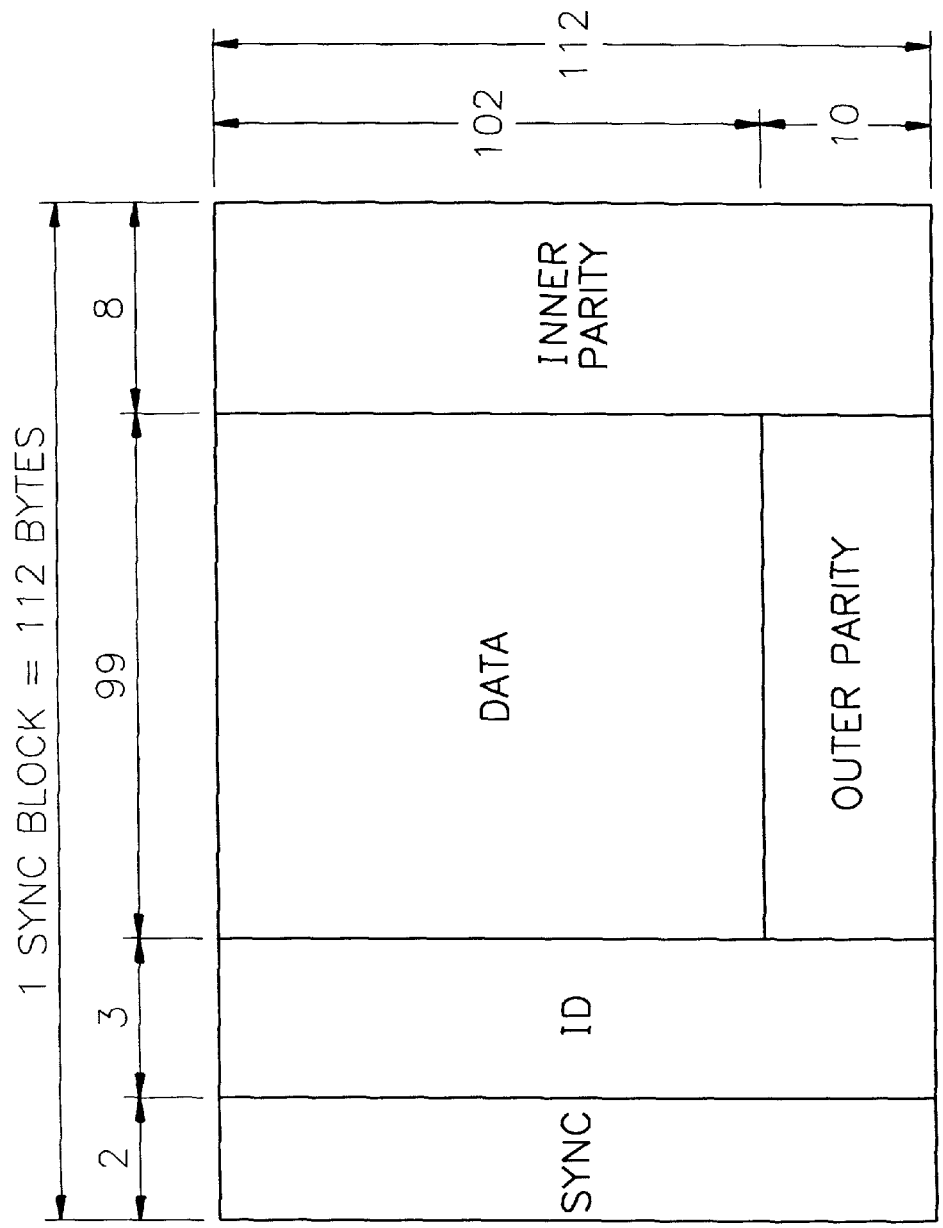
FIG. 5 is a view for showing a structure of one error correcting code (ECC) block in a D-VHS system standard.

FIG. 5 is a view for showing a structure of one error correcting code (hereinafter, referred to as "ECC") block in a D-VHS system standard. As shown in FIG. 5, one ECC block consists of 102 data sync blocks and 10 outer parity sync blocks. Main code area has 336 main data sync blocks. They consist of 306 data sync blocks and 30 outer parity sync blocks. The combined main code areas of 6 tracks consists of 18 ECC blocks.

Figure 6:
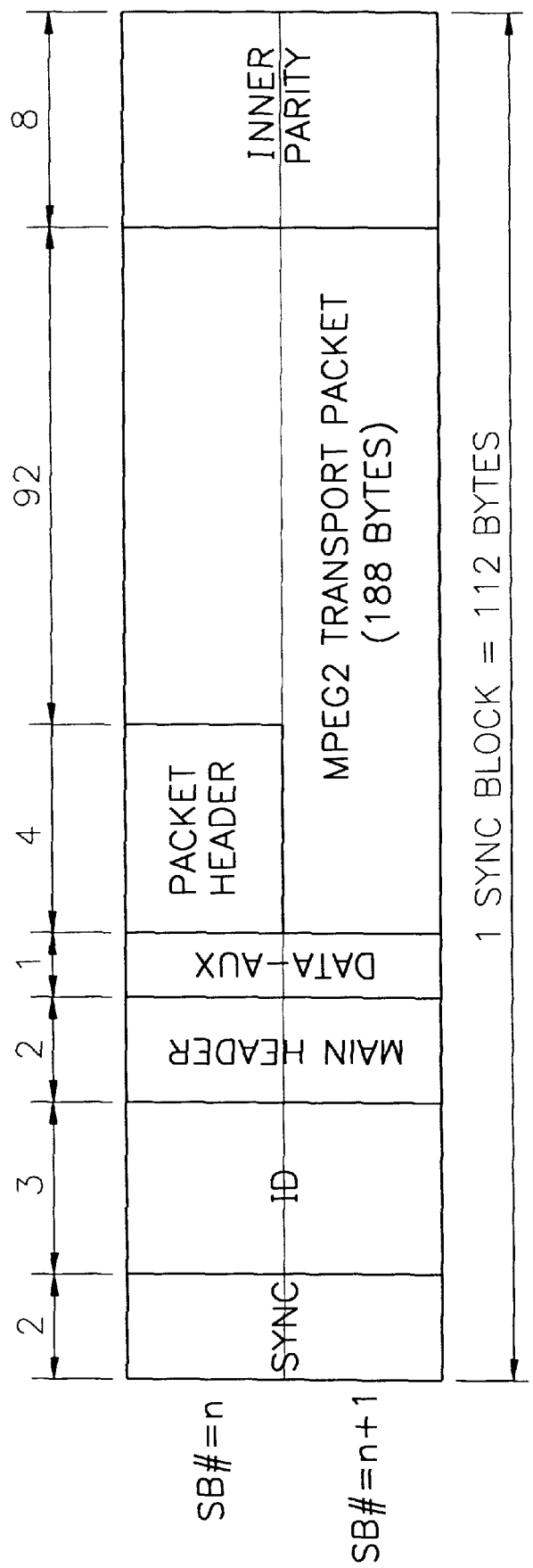
FIG. 6 is a view for showing an MPEG2 transport stream recording structure in an MPEG2 STD mode format of a D-VHS system standard.

FIG. 6 is a view for showing an MPEG2 transport stream recording structure in an MPEG2 STD mode format of a D-VHS system standard. As shown in FIG. 6, when application detail in main header is set to 000, MPEG2 transport stream is recorded. MPEG2 transport packet (188 bytes) and associated packet header information (4 bytes) are recorded onto two sync blocks.

Figure 7:
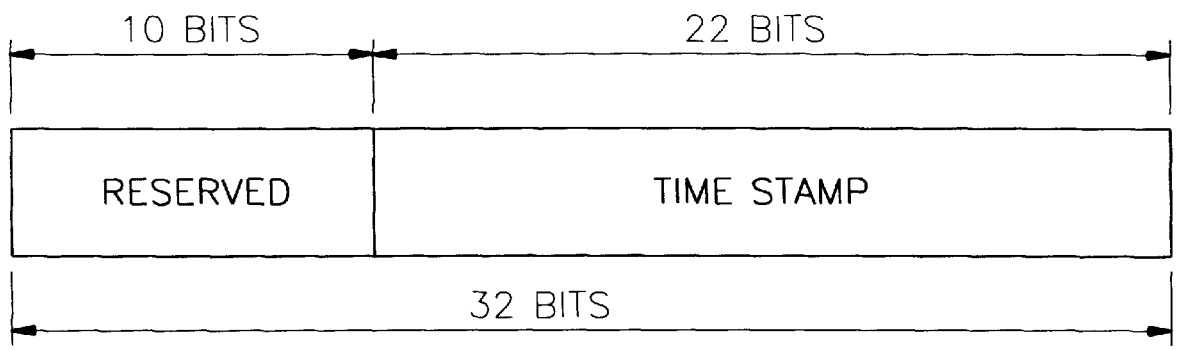
FIG. 7 is a view for showing a structure of a packet header which is included in the MPEG2 transport stream recording structure shown in FIG. 6.

FIG. 7 is a view for showing a structure of a packet header which is included in the MPEG2 transport stream recording structure shown in FIG. 6. As shown in FIG. 7, the lower 22 bits of the packer header are used for a time stamp which indicates the input time of the transport packet. Reserved bits shall be set to 0.

Figure 8:
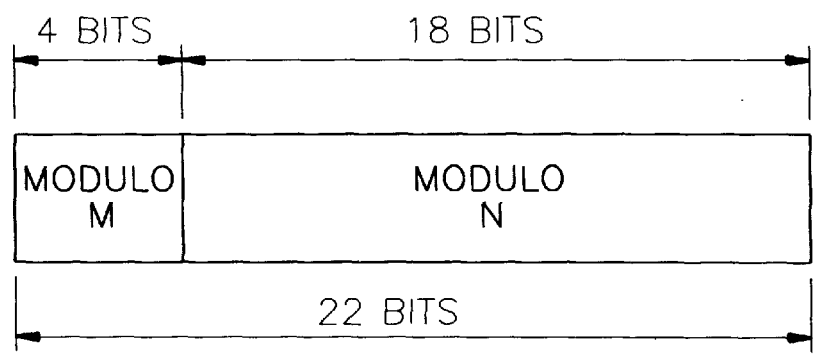
FIG. 8 is a view for showing a structure of a time stamp which is included in the packet header shown in FIG. 7.

FIG. 8 is a view for showing a structure of a time stamp which is included in the packet header shown in FIG. 7. As shown in FIG. 8, the time stamp is the input time of the transport packet and it is recorded as the sampled value of the local time stamp generator in order to put the exact same time interval of playback as that of the input. The clock frequency of the local time stamp generator is 27 [MHz] (±27 [rpm]) and while recording, it shall be phase-locked in the input PCR data. The default value of time stamp generated by the local time stamp generator is 0. The drum rotation phase should be synchronized with the value of the local time stamp generator during recording and playback. The upper 4 bits of the Time stamp indicate the value counted up every quarter rotation of a drum, and it repeats from 0 to 11 (mod 12). The lower 18 bits of the time stamp indicate the value counted up by the local time stamp generator (27 [MHz]), and it repeats from 0 to 224999 (mod 225000; 1800 [rpm]) or from 0 to 225224 (mod 225225; 1800/1.001 [rpm]).

Figure 9:
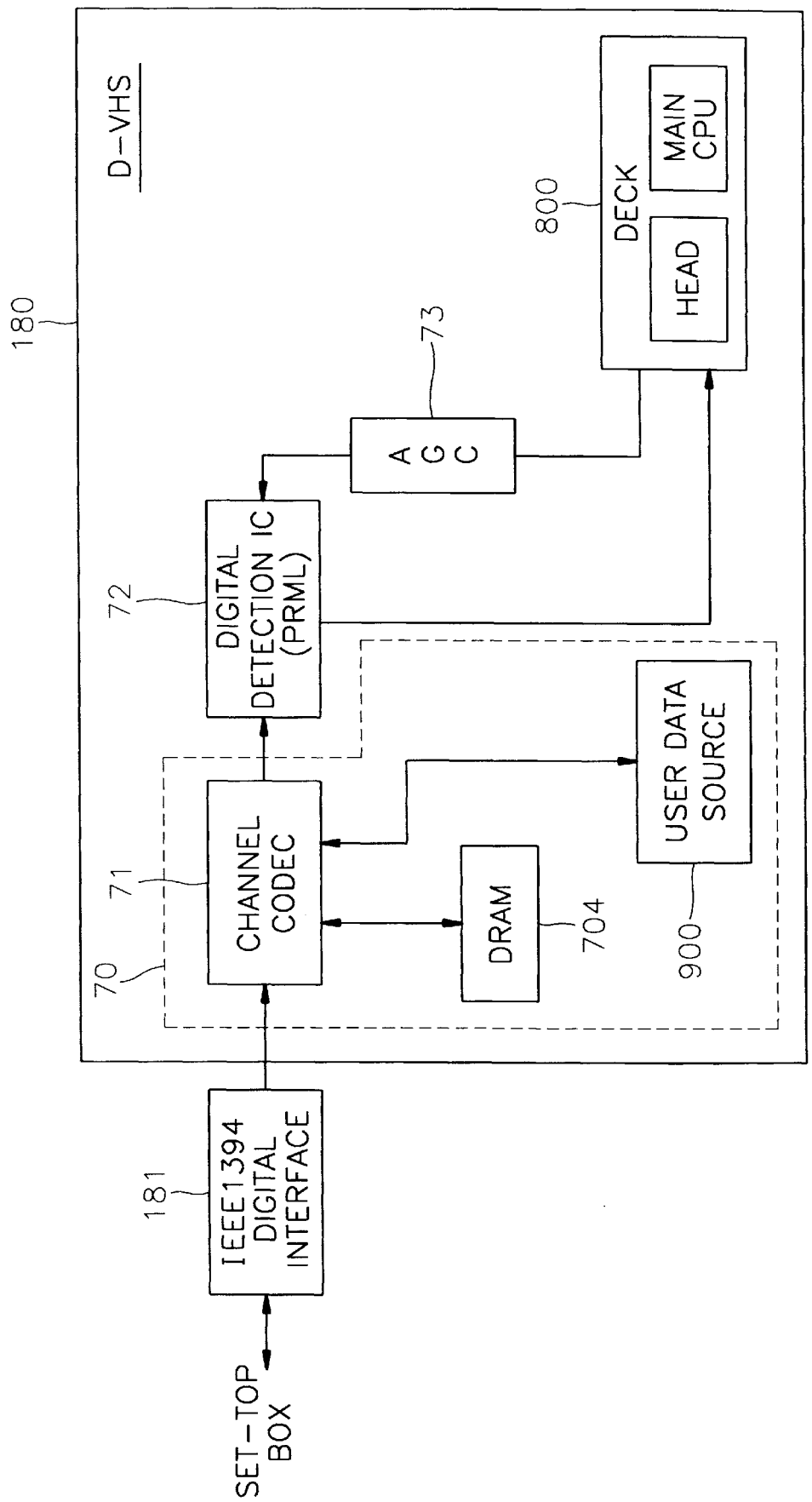
FIG. 9 is a block diagram for showing a circuit configuration of a D-VHS system according to an embodiment of the present invention.

FIG. 9 is a block diagram for showing a circuit configuration of a D-VHS system according to an embodiment of the present invention. As shown in FIG. 9 a D-VHS system 180 includes a deck 800, a recording/playback detector (i.e., partial response maximum likelihood; PRML) 72 which is implemented by a decision feedback equalizer (DEF), a channel codec 71 and a microcontroller, i.e., a user data source, 900. Reference numerals 70 and 73 denote a D-VHS codec and an automatic gain controller, respectively. The bit stream of digital data passes through IEEE1394 digital interface 181 and is provided to D-VHS system 180. When the bit stream passes through channel codec 71, additional information for the error correction is generated and the bit stream is recorded onto a tape, which is loaded in deck 800, with the additional information for the error correction through a recording coding process.

In playback, because bit data which is detected from the tape by recording/playback detector 72, is damaged due to the bit damage caused by an external environment, by the bit error which results from the resolution of recording/playback detector 72 and so on, the errors of the bit data are corrected. The error-corrected data passes through IEEE1394 digital interface 181 and is provided to a set-top box.

Figure 10:
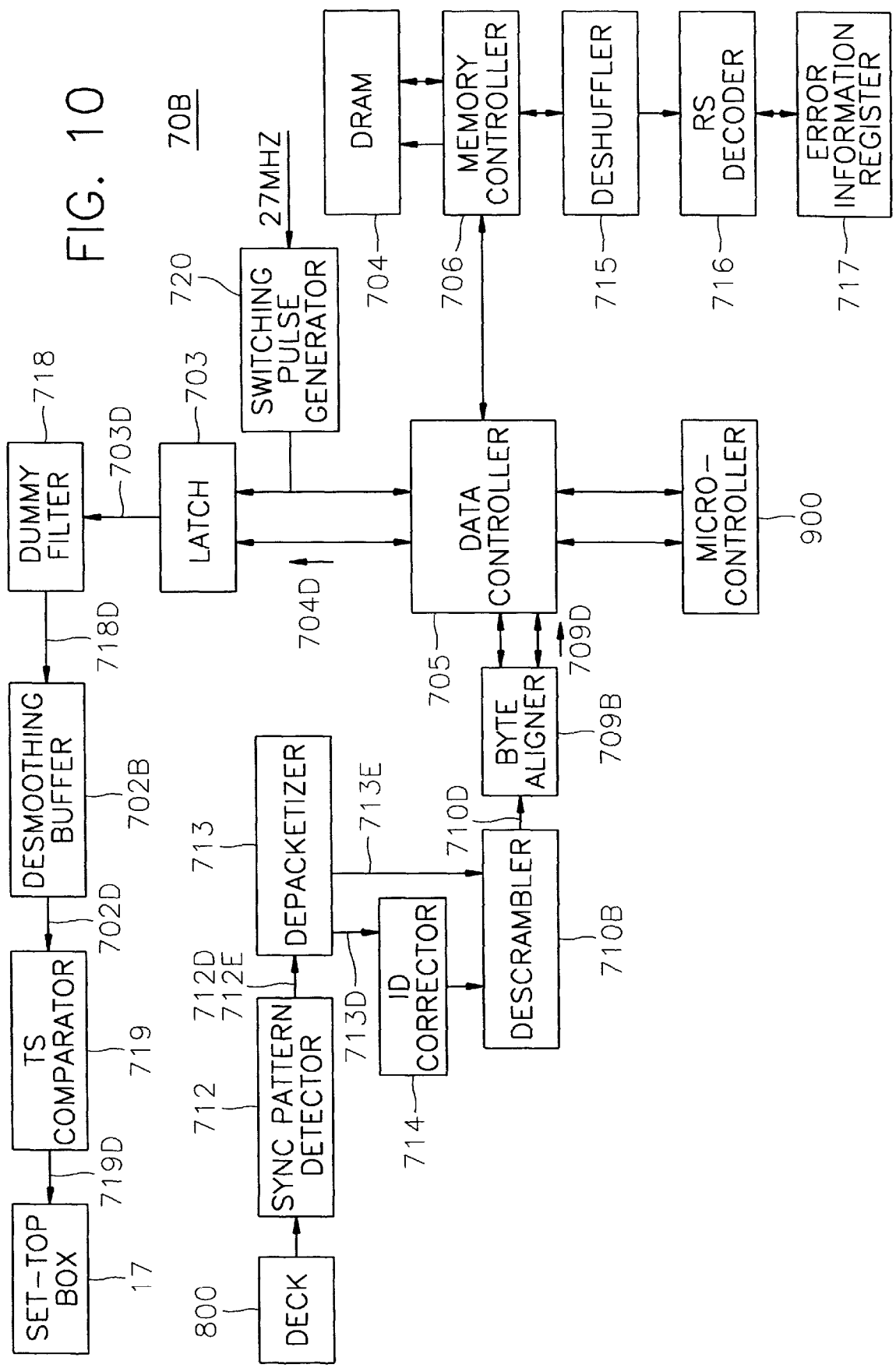
FIG. 10 is a block diagram for showing a circuit configuration of a decoder of a D-VHS codec system according to an embodiment of the present invention.

FIG. 10 is a block diagram for showing a circuit configuration of a decoder of a D-VHS codec system according to an embodiment of the present invention. As shown in FIG. 10, a decoder 70B comprises a sync pattern detector 712, a depacketizer 713, an ID corrector 714, a descrambler 710B, a byte aligner 709B, a memory 704, a data controller 705, a memory controller 706, a deshuffler 715, an RS decoder 716, an error information register 717, a latch 703, a dummy filter 718, a desmoothing buffer 702B, a time stamp comparator 719 and a microcontroller 900.

Sync pattern detector 712 divides a preamble, a subcode and a main code of each of tracks of digital data which has the format of a train of bits and is read from a tape loaded in a deck 800, and detects sync data in the subcode and the main code in order to provide both sync-pattern-detected data 712D and information 712E related to a format thereof. Sync pattern detector 800 is so configured as to dynamically adapt to the tape read hopping, to the bit loss due to the error of an equalizer, and to the burst error.

Depacketizer 713 divides to store the sync-pattern-detected data 712D from sync pattern detector 712 in the sync block of unit based on information 712E related to the format of sync-pattern-detected data 712D from a sync pattern detector 712. Also, depacketizer 713 provides a read data 713E in the sync block of unit and classifies an ID included in a header of each of the sync blocks in order to provide a classified ID 713D.

ID corrector 714 judges whether or not classified ID 713D from depacketizer 713 is damaged, and provides a corrected ID 714D by executing an error correction of classified ID 713D when an error occurs.

Descrambler 710B descrambles read data 713E in the sync block of unit from depacketizer 713 by using corrected ID 714D from ID corrector 714 as an initial value, and provides a descrambled data 710D. Descrambler 710B is configured with the same hardware that a scrambler 710A which is included in coder 70A of the D-VHS codec system is configured with, and uses the same primitive polynomial that scrambler 710A uses.

Byte aligner 709B stores on a higher or a lower rank of local memory banks both main data sync blocks and subcode sync blocks which are respectively configured in the format of the track in descrambled data 710D from descrambler 710B, and provides deformatted sync block data 709D.

Memory 704 sequentially records deformatted sync block data 709D in a relevant track thereof in accordance with a recording control signal in synchronization with a system clock on the basis of the address thereof which is computed by the value of an ID included in deformatted sync block data 709D from byte aligner 709B.

During the recording of data or when receiving a request for reading out data, data controller 705 allocates a time for each device to access memory 704, and arbitrates data requirements which collide with each other. Data controller 705 receives subcode data from microcontroller 900 and records the subcode data at a relevant address of memory 704 which is provided by memory controller 706. Data controller 705 receives system data from microcontroller 900 and records the system data at a relevant address of memory 704 which is provided by memory controller 706, and generates a code in accordance with the order of the track in order to record the generated code at a parity section of each of the sync blocks of memory 704 after the coding is completed with respect to the main data recorded in 6 tracks of memory 704.

Memory controller 706 provides both a recording/readout address of a memory location and a recording/readout control signal in order to record or read out the data onto/from memory 704 under the control of data controller 705. Memory controller 706 computes an address of memory 704 corresponding to a relevant track number and a sync block number of a relevant track on the basis of the ID of each of the sync blocks, and records each of the sync block data.

When data controller 705 judges that the sync block data included in a predetermined number of tracks is completely recorded in a relevant track of memory 704, deshuffler 715 deshuffles the sync blocks for an error correcting coding from the tracks having the sync block data recorded therein in order to provide deshuffled sync blocks. When data controller 705 judges that the sync block data included in 6 tracks numbered 0 to 5 is completely recorded on memory 704, deshuffler 715 deshuffles the sync blocks for the error correcting coding from the 6 tracks having the recorded data therein. Deshuffler 715 deshuffles the sync blocks in order to correct an error in an error correcting code of unit which is used in recording data onto memory 704.

RS decoder 716 sequentially executes an inner decoding and an outer decoding in the sync block of unit with respect to the deshuffled sync blocks from deshuffler 715, and provides an error position information and an error magnitude information of each of the sync blocks. RS decoder 716 corrects the error in the process of the outer decoding having a correction capability superior to the inner decoding after distinguishing to erasure-process the sync blocks which cannot be error corrected, through the process of the inner decoding in order to enhance the capability of the error correction.

Error information register 717 sequentially stores in assigned positions both the error position information and the error magnitude information of each of the sync blocks from RS decoder 716. Error information register 717 is implemented by an embedded static RAM. Error information register 717 continually executes the error correction with respect to the sync blocks in order to decrease a latency having a time interval which is equivalent to 2 to 3 sync blocks required for RS decoder 716 to decode one sync block, and to execute a fast operation.

Memory controller 706 computes a relevant address of memory 704 while reading out the error position information which is stored in error information register 717, and corrects an error of a relevant correction data by a memory write operation. The error correction process is completed with respect to 6 tracks when the error correction is completed with respect to 18 error correcting code blocks.

When data controller 705 judges after the error correction is completed that a playback stop signal is in an inactive state, latch 703 stores a firstly-read sync block data 704D in the order of the track and the sync block while reading out error-corrected sync block data via data controller 705 by requesting data controller 705 to provide the error-corrected sync block data recorded on memory 704. Latch 703 then outputs a secondly-read sync block data 703D.

Dummy filter 718 excludes dummy sync block data from secondly-read sync block data 703D from latch 703, and provides only normal sync block data 718D.

Desmoothing buffer 702B stores normal sync block data 718D from dummy filter 718 in synchronization with the switching signal under the control of data controller 705.

While reading the time stamp of each of the sync block data of the normal sync block data 702D which is read out from desmoothing buffer 702B, time stamp comparator 719 compares the time stamp with a present reference time stamp data, and controls a point of a data transmission time to set-top box 17.

A switching pulse generator 720 generates a switching pulse in response to a pulse signal having the period of 27 [MHz], and provides the switching pulse to latch 703 and to data controller 705.

Figure 11:
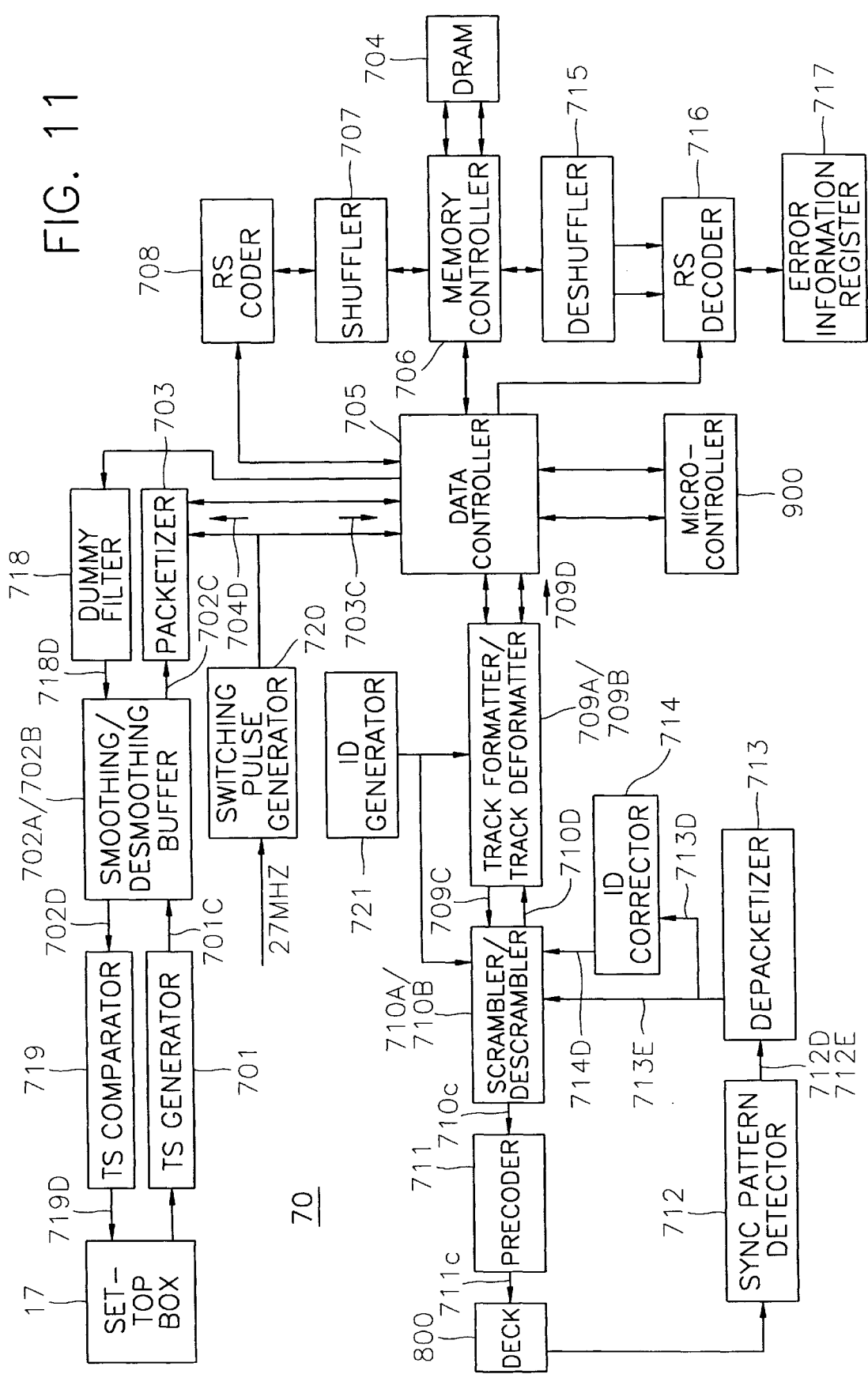
FIG. 11 is a block diagram for showing a circuit configuration of a codec of a D-VHS codec system according to an embodiment of the present invention.

FIG. 11 is a block diagram for showing a circuit configuration of a codec of a D-VHS codec system according to an embodiment of the present invention. As shown in FIG. 11, a codec 70 of a D-VHS codec system comprises a time stamp generator 701, a memory 704, a data controller 705, a memory controller 706, a shuffler 707, an RS coder 708, a precoder 711, a sync pattern detector 712, a depacketizer 713, an ID corrector 714, a scrambler/descrambler 710A/ 710B, a track formatter/track deformatter 709A/709B, a deshuffler 715, an RS decoder 716, an error information register 717, a packetizer 703, a dummy filter 718, a smoothing/desmoothing buffer 702A/702B, a time stamp comparator 719 and a microcontroller 900.

When the digital broadcast data is inputted in a train of bits in the form of the transport stream packet element via set-top box 17, time stamp generator 701 generates a time stamp representing an arrival time of a first byte of each of transport stream packet elements of digital broadcast data, and provides transport packet data 701C by annexing the relevant time stamp to a packet header of each of the transport stream packet elements.

In recording, memory 704 sequentially records a packetized data 703C in a relevant track thereof in accordance with a recording control signal in synchronization with a system clock on the basis of the address thereof which is computed by the value of an ID which is included in a first additional information of the packetized data 703C. In playback, memory 704 sequentially records a deformatted sync block data 709D in a relevant track thereof in accordance with a recording control signal in synchronization with a system clock on the basis of the address thereof which is computed by the value of an ID which is included in the deformatted sync block data 709D.

During the recording of data or when receiving a request for reading out data, data controller 705 allocates time among devices to access memory 704 and arbitrates data requirements which collide with each other. Data controller 705 receives subcode data from microcontroller 900 and records the subcode data at a relevant address of memory 704 which is provided by memory controller 706. Data controller 705 receives system data from microcontroller 900 and records the system data at a relevant address of memory 704 which is provided by memory controller 706, and generates a code in accordance with the order of the track in order to record the generated code at a parity section of each of the sync blocks of memory 704 after the coding is completed with respect to the main data recorded in 6 tracks of memory 704.

Memory controller 706 provides both a recording/readout address of a memory location and a recording/readout control signal in order to record or read out the data onto/from memory 704 under the control of data controller 705.

Shuffler 707 shuffles the sync blocks which are equivalent to the packetized data 703C recorded in the tracks of memory 704, and generates error correcting code blocks.

RS coder 708 respectively executes an inner RS coding and an outer RS coding in a horizontal direction and in a vertical direction with respect to each of the error correcting code blocks from shuffler 707, and generates a parity.

Precoder 711 precodes all data of the sync blocks except ambles and margins which are included in a scrambled data 710C, and provides precoded data 711C to the tape loaded in deck 800.

Sync pattern detector 712 divides a preamble, a subcode and a main code of each of the tracks of digital data having the format of a train of bits and being read from the tape loaded in deck 800, and detects sync data in the subcode and the main code in order to provide both sync-pattern-detected data 712D and information 712E which is related to a format thereof.

Depacketizer 713 divides to store sync-pattern-detected data 712D from sync pattern detector 712 in the sync block of unit based on information 712E related to the format of sync-pattern-detected data 712D from a sync pattern detector 712. Depacketizer 713 provides a read data 713E in the sync block of unit and classifies an ID included in a header of each of the sync blocks in order to provide a classified ID 713D.

ID corrector 714 judges whether or not classified ID 713D from depacketizer 713 is damaged, and provides a corrected ID 714D by executing an error correction of classified ID 713D when an error occurs.

In recording, scrambler/descrambler 710A/710B scrambles by M-sequence data both main code sync blocks and subcode sync blocks of track-formatted data 709C when establishing the relevant IDs as initial values thereof, and provides scrambled data 710C. In playback, scrambler/ descrambler 710A/710B descrambles read data 713E in the sync block of unit from depacketizer 713 by using corrected ID 714D from ID corrector 714 as an initial value, and provides a descrambled data 710D.

In recording, track formatter/track deformatter 709A/ 709B configures read sync blocks in the format of the track while reading out frame data recorded on memory 704 via data controller 705 in the order of the track and in the order of the sync block of each of the tracks after the coding is completed by RS coder 708, and provides track-formatted data 709C. In playback, track formatter/track deformatter 709A/709B stores on a higher or a lower rank of local memory banks both main data sync blocks and subcode sync blocks which are respectively configured in the format of the track in descrambled data 710D from scrambler/descrambler 710A/710B, and provides a deformatted sync block data 709D.

When data controller 705 judges that the sync block data included in six tracks is completely recorded in a relevant track of memory 704, deshuffler 715 deshuffles the sync blocks for an error correcting coding from the tracks having the sync block data recorded therein and provides deshuffled sync blocks.

RS decoder 716 sequentially executes an inner decoding and an outer decoding in the sync block of unit with respect to the deshuffled sync blocks from deshuffler 715, and provides an error position information and an error magnitude information of each of the sync blocks.

Error information register 717 sequentially stores in assigned positions both the error position information and the error magnitude information of each of the sync blocks from RS decoder 716.

In recording, packetizer 703 separates each of smoothened transport packet data 702C, including the normal data, into two sync blocks, and provides packetized data 703C by annexing the first additional information to the header of each of the sync blocks. In playback, when data controller 705 judges after the error correction is completed that a playback stop signal is in an inactive state, packetizer 703 stores firstly-read sync block data 704D in the order of the track and the sync block while reading out error-corrected sync block data via data controller 705 by requesting data controller 705 to provide the error-corrected sync block data recorded on memory 704. Packetizer 703 outputs secondly-read sync block data 703D.

Dummy filter 718 excludes dummy sync block data from the secondly-read sync block data 703D from packetizer 703, and provides only normal sync block data 718D.

In recording, smoothing/desmoothing buffer 702A/702B sequentially stores transport packet data 701C from time stamp generator 701 while changing a variable time interval among a series of transport stream packet elements into a constant time interval with respect to transport packet data 701C, and provides smoothened transport packet data 702C. In playback, smoothing/desmoothing buffer 702A/702B stores normal sync block data 718D from dummy filter 718 in synchronization with the switching signal under the control of data controller 705.

While reading the time stamp of each of the sync block data with respect to the normal sync block data 702D which is read out from smoothing/desmoothing buffer 702A/702B, time stamp comparator 719 compares the time stamp with a present reference time stamp data and controls a point of a data transmission time to set-top box 17

A switching pulse generator 720 generates a switching pulse in response to a pulse signal having the period of 27 [MHz], and provides the switching pulse to latch 703 and to data controller 705.

An ID generator 721 generates an ID signal in recording and provides the ID signal to track formatter 709A and scrambler 710A.

Figure 12:
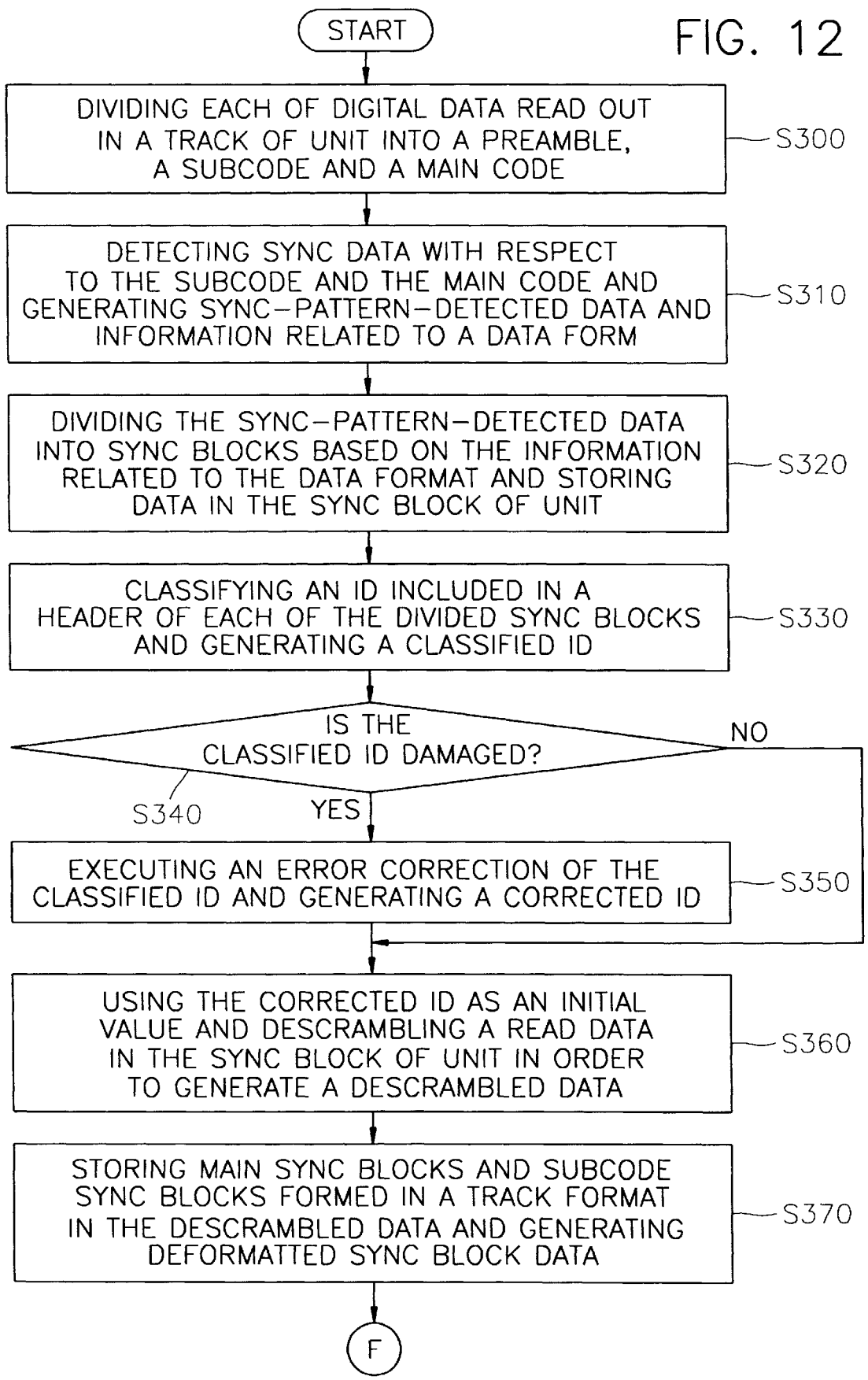
FIGS. 12 to 15 are a flow chart for illustrating a D-VHS decoding method which is executed by the D-VHS decoder shown in FIG. 10 or by the D-VHS codec shown in FIG. 11.
Figure 15:
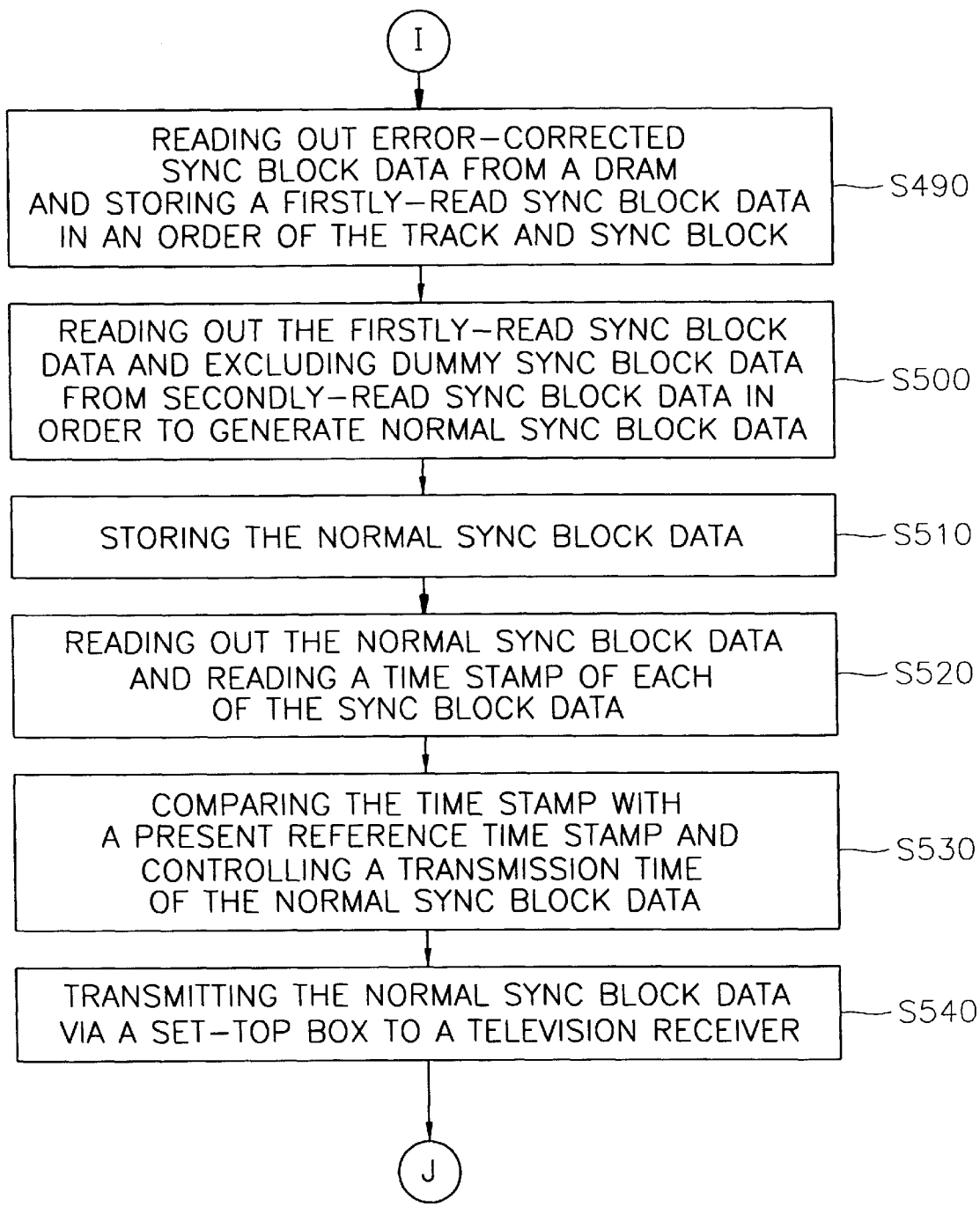

A description will next be made of the procedure of a D-VHS decoding method which is executed by the D-VHS decoder shown in FIG. 10 or the D-VHS codec shown in FIG. 11, in accordance with the flowchart of FIGS. 12 and 15.

FIGS. 12 to 15 are a flow chart for illustrating a D-VHS decoding method which is executed by the D-VHS decoder shown in FIG. 10 or by the D-VHS codec shown in FIG. 11.

Digital broadcast data which is propagated from a broadcasting station via a satellite is received in a train of bits in the form of a transport stream packet element via set-top box 17 (step S10). A time stamp which represents an arrival time of a first byte of each of the transport stream packet elements of the digital broadcast data which is received in step S10 is generated by time stamp generator 701 (step S20). The time stamp which is generated in step S20 is annexed to a packet header of each of the transport stream packet elements by time stamp generator 701, and transport packet data 701C having the time stamp annexed thereto is generated (step S30).

Transport packet data 701C which has the time stamp annexed thereto in step S30 is stored onto smoothing buffer 702A (step S40).

In steps S50 and S60, stuffings are inserting among transport packet data 701C on the basis of the time stamp of transport packet data 701C stored on smoothing buffer 702A in step S40 and the data is converted into data having a predetermined data rate. Data-rate-converted transport packet data 702C is read out from smoothing buffer 702A.

Whether or not the time stamp of the transport packet data 701C which is stored on smoothing buffer 702A in step S40 is the same as a reference time stamp is determined (step S50). When it is judged in step S50 that the time stamp is the same as the reference time stamp, it is determineed that data which is included in transport packet data 701C stored on the smoothing buffer 702A is normal data, and transport packet data 701C which has the normal data is read out from smoothing buffer 702A (step S60).

Each of transport packet data 702C which is read from smoothing buffer 702A and which includes the normal data is separated into two sync blocks by packetizer 703 (step S70). First additional information which includes an ID, a main header and a data-AUX of each of the sync blocks which is separated in step S70, is generated by packetizer 703 (step S80). The first additional information which is generated in step S80 is annexed to each of the headers of the sync blocks, and packetized data 703C is generated (step S90).

When it is judged in step S50 that the time stamp is not the same as the reference time stamp, it is determined that data which is included in transport packet data 701C stored on smoothing buffer 702A is dummy data, and transport packet data 701C which has the dummy data is read out from smoothing buffer 702A (step S100). Step S100 proceeds to step 80.

Packetized data 703C which is generated in step S80 is recorded in a relevant track of memory 704 in accordance with a recording control signal in synchronization with a system clock on the basis of the address of memory 704 which is computed by the value of an ID which is included in the first additional information generated in step S80 (S110).

Whether or not the packetized data 703C which is generated in step S90 is sequentially recorded in step S110 by up to a predetermined number of tracks on memory 704, is judged by data controller 705 (step S120).

When it is judged in step S120 that packetized data 703C is completely recorded in the relevant tracks, the sync blocks which are included in six tracks of packetized data 703C which is newly recorded in step S110 are shuffled by shuffler 707, and error correcting code blocks are generated (step S130). An outer RS coding is executed by RS coder 708 in a vertical direction with respect to each of the error correcting code blocks which are generated in step S130, and an outer parity is generated (step S140). An inner RS coding is executed by RS coder 708 in a horizontal direction with respect to each of the error correcting code blocks which are generated in step S130, and an inner parity is generated (step S150).

Data controller 705 judges whether or not a recording stop signal is in an enable state (step S160).

When it is judged in step S120 that packetized data 703C is not completely recorded in the relevant tracks, the sync blocks which are included in six tracks of packetized data 703C which is previously recorded on memory 704 are shuffled by shuffler 707, and error correcting code blocks are generated (step S170). An outer RS coding is executed by RS coder 708 in a vertical direction with respect to each of the error correcting code blocks which are generated in step S170, and an outer parity is generated (step S180). An inner RS coding is executed by RS coder 708 in a horizontal direction with respect to each of the error correcting code blocks which are generated in step S170, and an inner parity is generated (step S190). Step S190 proceeds to step S160.

When it is judged in step S160 that the recording stop signal is not in the enable state, ambles and margins for the main code sync blocks and the subcode sync blocks read from memory 704 in the order of the track and in the order of the sync block of each of the tracks, are generated by track formatter 709A based on both positions and magnitudes of the main code sync blocks and those of the subcode sync blocks (step S200). A sync pattern and an ID for each of the main code sync blocks and the subcode sync blocks are generated by track formatter 709A (step S210). A second additional information which includes the ambles and the margins generated in step S200 and which includes the sync pattern and the ID which are generated in step S210, are annexed to the main sync blocks and the subcode sync blocks which are read from memory 704, and track-formatted data 709C is generated (S220).

Both main code sync blocks and subcode sync blocks of the frame data which is configured in the format of the track in step S210, is scrambled by scrambler 710A in M-sequence when establishing the relevant IDs as initial values thereof, and scrambled data 710C is generated (step S230).

All data of the sync blocks except ambles and margins which are included in the scrambled data 710C which is generated in step S230 are precoded by precoder 711, and precoded data 711C is generated (step S240).

Precoded data 711C which is generated in step S240 is recorded on the tape which is loaded in deck 711C (S250).

Step S250 returns to step S160. When it is judged in step S160 that the recording stop signal is in the enable state, a recording operation stops.

Figure 13:
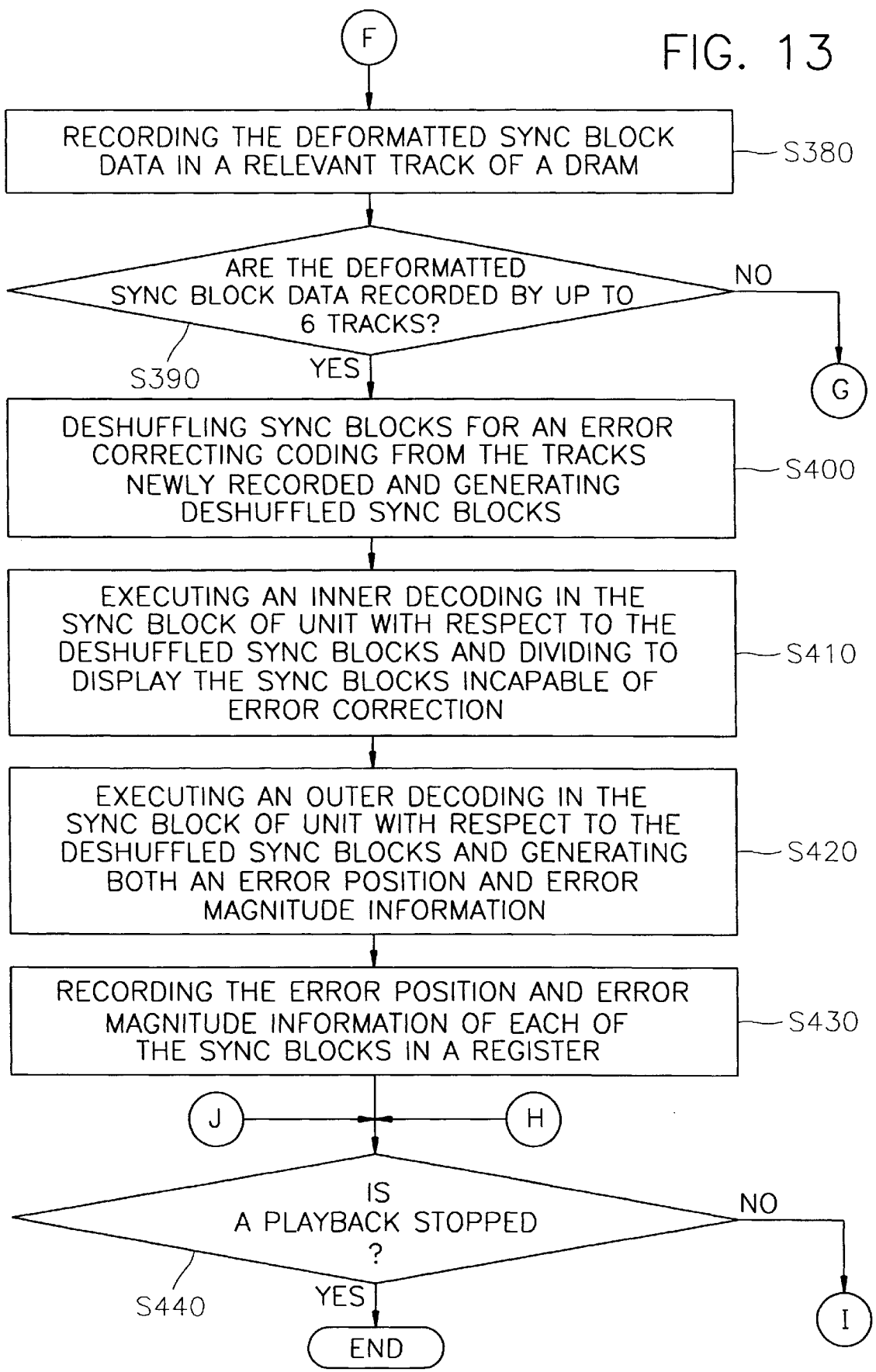
Figure 14:
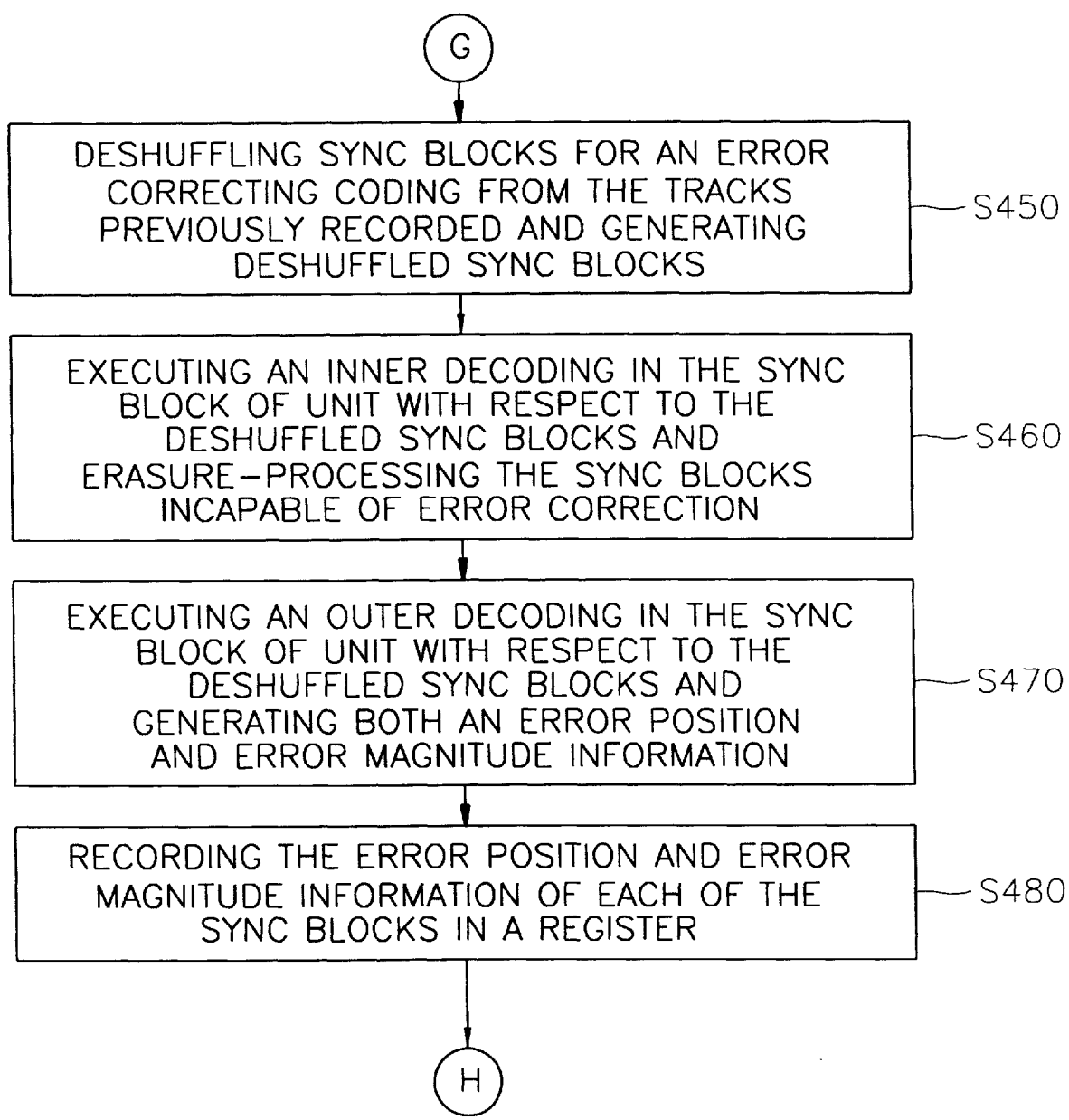

A description will next be made of the procedure of a D-VHS decoding method which is executed by the D-VHS decoder shown in FIG. 13 or the D-VHS codec shown in FIG. 14, in accordance with the flowchart of FIGS. 19 and 22.

Each of digital data having the format of a train of bits and being read out in the track of unit from the tape loaded in deck 800 is divided into a preamble, a subcode and a main code by sync pattern detector 712 (step S300). Sync data which represents boundaries among consecutively-placed sync blocks with respect to the subcode and the main code is detected by sync pattern detector 712, and both sync-pattern-detected data 712D and information 712E related to a format thereof are generated (step S310).

Sync-pattern-detected data 712D which is generated in step S310 is divided into sync blocks based on the information 712E which is related to the format of sync-pattern-detected data 712D, and the data in the sync block of unit is stored in depacketizer 713 (step S320). An ID which is included in a header of each of the sync blocks which are divided in step S320 is classified by depacketizer 713, and a classified ID 713D is generated (step S330).

Whether or not classified ID 713D generated in step S330 is damaged, is judged by ID corrector 714 (step S340). When it is judged in step S340 that classified ID 713D is damaged, an error correction of classified ID 713D is executed by ID corrector 714, and a corrected ID 714D is generated (step S350).

While data in the sync block of unit stored in step S320 is read out, a read data 713E in the sync block of unit is descrambled by descrambler 710B by using corrected ID 714D generated in step S350 as an initial value, and a descrambled data 710D is generated (step S360).

When it is judged in step S340 that classified ID 713D is not damaged, step S340 proceeds to step S360.

Both main data sync blocks and subcode sync blocks which are respectively configured in the format of the track in descrambled data 710D generated in step S360, are stored on a higher or a lower rank of local memory banks of byte aligner 709B, and a deformatted sync block data 709D is generated (step S370). Deformatted sync block data 709D which is generated in step S370, is recorded in a relevant track of memory 704 in accordance with a recording control signal in synchronization with a system clock on the basis of the address of memory 704 which is computed by the value of the ID of deformatted sync block data 709D (step S380).

Whether or not deformatted sync block data 709D is sequentially recorded in step S380 by up to six tracks, is judged by data controller 705 (step S390).

When it is judged in step S390 that deformatted sync block data 709D is completely recorded in a relevant track, sync blocks for an error correcting coding are deshuffled by deshuffler 715 from the tracks which are newly recorded in step S380, and deshuffled sync blocks are generated (S400). An inner RS decoding is executed by RS decoder 716 in the sync block of unit with respect to the deshuffled sync blocks which are generated in step S400, and the sync blocks which cannot be error corrected are divided and displayed (step S410). An outer RS decoding having a correction capability which is superior to the inner RS decoding is executed by RS decoder 716 in the sync block of unit with respect to the deshuffled sync blocks which are generated in step S400, and both an error position information and an error magnitude information of each of the sync blocks are generated (step S420).

Both the error position information and the error magnitude information of each of the sync blocks which are generated in step S420, are stored in sequence in positions, assigned thereto, of error information register 717 (step S430).

Whether or not a playback stop signal is in an enable state, is judged by data controller 705 (step S440).

When it is judged in step S390 that deformatted sync block data 709D is not completely recorded in a relevant track, sync blocks for an error correcting coding are deshuffled by deshuffler 715 from six tracks which are previously recorded on memory 704, and deshuffled sync blocks are generated (S450). An inner RS decoding is executed by RS decoder 716 in the sync block of unit with respect to the deshuffled sync blocks which are generated in step S450, and the sync blocks which cannot be error corrected are erasure-processed (S460). An outer RS decoding having a correction capability which is superior to that of the inner RS decoding is executed by RS decoder 716 in the sync block of unit with respect to the deshuffled sync blocks which are generated in step S450, and both an error position information and an error magnitude information of each of the sync blocks are generated (step S470). Both the error position information and the error magnitude information of each of the sync blocks generated in step S470 are stored in sequence in positions, assigned thereto, of error information register 717 (step S480). Step S480 proceeds to step S440.

When it is judged in step S440 after the error correction is completed that the playback stop signal is not in the enable state error-corrected sync block data recorded on memory 704 is read out, and a firstly-read sync block data 704D is stored in the order of the track and the sync block in latch 703 (step S490). Dummy sync block data is excluded from secondly-read sync block data 703D which is generated by reading out the firstly-read sync block data 704D stored in step S490, and only normal sync block data 718D is generated (step S500). Normal sync block data 718D which is generated in step S500, is stored in accordance with a switching signal and a control signal in desmoothing buffer 702B (step S510).

The normal sync block data which is stored in step S510 is read out, and a value of a time stamp of each of the sync block data is read by time stamp comparator 719 (step S520). The value of the time stamp of each of the sync block data which is read in step S520 is compared with a value of a present reference time stamp, and a transmission time of the normal sync block data is controlled (step S530). Normal sync block data 719D having a transmission time which is controlled in step S530, is transmitted via set-top box 17 to the television receiver (step S540). Step S540 returns to step S440.

When it is judged in step S440 that the playback stop signal is in the enable state, a playback operation stops.

In the decoding method and the decoder of a D-VHS codec system according to the present invention, an enormous quantity of computation which cannot be processed by programs, is performed in real time by an optimal data flow operation process method and the compressed or processed digital data is processed at a high speed. Also, a hardware configuration of the codec which conventionally includes two or three pieces of circuit board implements one custom-made semiconductor chip and cuts a unit cost of the manufacturing of the D-VHS codec.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A decoding method of a D-VHS codec system, said method comprising the steps of:

(i) detecting both a sync pattern and a format of data in each of tracks of digital data having the format of a train of bits and being read from a tape loaded in a deck, and generating sync-pattern-detected data;

(ii) dividing the sync-pattern-detected data generated in step (i) into sync blocks while storing the data in the sync block of unit, and classifying an ID included in a header of each of the sync blocks;

(iii) performing an error correction of the classified ID generated in step (ii) on the basis of whether or not the classified ID is damaged, and generating a corrected ID;

(iv) descrambling a read data in the sync block of unit by using the corrected ID generated in step (iii) as an initial value while reading out data in the sync block of unit stored in step (ii), and generating a descrambled data;

(v) storing on a first predetermined number of local memory banks both main data sync blocks and subcode sync blocks respectively configured in the format of the track in the descrambled data generated in step (iv), and generating a deformatted sync block data;

(vi) recording the deformatted sync block data generated in step (v) in a relevant track of a memory in accordance with a recording control signal in synchronization with a system clock on the basis of an address of said memory computed by the value of the ID of the deformatted sync block data;

(vii) judging whether or not the deformatted sync block data is sequentially recorded in step (vi) up to a second predetermined number of tracks;

(viii) deshuffling the sync blocks of the deformatted sync block data newly recorded in step (vi) when it is judged in step (vii) that the deformatted sync block data is completely recorded in a relevant track, and executing both an inner decoding and an outer decoding in order to generate both an error position information and an error magnitude information of each of the sync blocks;

(ix) storing in sequence both the error position information and the error magnitude information of each of the sync blocks generated in step (viii) in positions, assigned thereto, of error information register;

(x) judging whether or not a playback stop signal is in an enable state;

(xi) storing only a normal sync block data among read sync block data equivalent to error-corrected sync block data when it is judged in step (x) that the playback stop signal is not in the enable state;

(xii) transmitting a normal sync block data having a controlled point of a transmission time to a set-top box based on a relative time interval of a transport stream packet entered when the normal sync block data is recorded on the tape while reading out the normal sync block data stored in step (xi); and (xiii) stopping a playback operation when it is judged in step (x) that the playback stop signal is in the enable state.

2. The decoding method of a D-VHS codec system as claimed in claim 1, wherein said step (i) comprises the substeps of:

(A) dividing each of digital data having the format of a train of bits and being read out in the track of unit from a tape loaded in a deck, into a preamble, a subcode and a main code; and (B) detecting sync data representing boundaries among consecutively-placed sync blocks of the subcode and the main code, and generating both sync-pattern-detected data and information related to a format thereof.

3. The decoding method of a D-VHS codec system as claimed in claim 1, wherein said step (ii) comprises the substeps of:

(C) dividing the sync-pattern-detected data generated in step (i) into sync blocks based on the information related to the format of the sync-pattern-detected data, and storing the data in the sync block of unit; and (D) classifying an ID included in a header of each of the sync blocks divided in step (C) and generating a classified ID.

4. The decoding method of a D-VHS codec system as claimed in claim 1, wherein said step (iii) comprises the substeps of:

(E) judging whether or not the classified ID generated in step (ii) is damaged; and (F) executing an error correction of the classified ID when it is judged in step (E) that the classified ID is damaged, and generating a corrected ID.

5. The decoding method of a D-VHS codec system as claimed in claim 1, further comprising the substeps of:

proceeding to step (iv) when it is judged in step (iii) that the classified ID is not damaged.

6. The decoding method of a D-VHS codec system as claimed in claim 1, wherein said step (viii) comprises the substeps of:

(K) deshuffling sync blocks for an error correcting coding from the tracks newly recorded in step (vi) when it is judged in step (vii) that the deformatted sync block data is completely recorded in a relevant track, and generating deshuffled sync blocks;

(L) executing an inner RS decoding in the sync block of unit with respect to the deshuffled sync blocks generated in step (K) and dividing to display the sync blocks incapable of error correction; and (M) executing an outer RS decoding having a correction capability superior to the inner RS decoding in the sync block of unit with respect to the deshuffled sync blocks generated in step (K), and generating both an error position information and an error magnitude information of each of the sync blocks.

7. The decoding method of a D-VHS codec system as claimed in claim 1, wherein said step (xi) comprises the substeps of:

(P) reading out error-corrected sync block data recorded on said memory after the error correction is completed when it is judged in step (x) that the playback stop signal is not in the enable state, and storing a firstly-read sync block data in an order of the track and the sync block;

(Q) excluding dummy sync block data from secondly-read sync block data generated by reading out the firstly-read sync block data stored in step (P), and generating only normal sync block data; and (R) storing the normal sync block data generated in step (Q) in accordance with a switching signal and a control signal.

8. The decoding method of a D-VHS codec system as claimed in claim 1, wherein said step (xii) comprises the substeps of:

(S) reading out the normal sync block data stored in step (xi) and reading a value of a time stamp of each of the sync block data;

(T) comparing the value of the time stamp of each of the sync block data read in step (S) with a value of a present reference time stamp, and controlling a transmission time of the normal sync block data;

(U) transmitting the normal sync block data having a transmission time controlled in step (T) via a set-top box to a television receiver; and (V) returning to step (x) after performing step (U).

9. The decoding method of a D-VHS codec system as claimed in claim 1, further comprising the substeps of:

(a) deshuffling sync blocks for an error correction coding from a predetermined number of the tracks previously recorded on said memory when it is judged in step (vii) that the deformatted sync block data is not completely recorded in a relevant track, and generating deshuffled sync blocks;

(b) executing an inner RS decoding in the sync block of unit with respect to the deshuffled sync blocks generated in step (a) and erasure-processing the sync blocks incapable of error correction; and (c) executing an outer RS decoding having a correction capability superior to the inner RS decoding in the sync block of unit with respect to the deshuffled sync blocks generated in step (a), and generating both an error position information and an error magnitude information of each of the sync blocks;

(d) storing in sequence both the error position information and the error magnitude information of each of the sync blocks generated in step (c) in positions, assigned thereto, of error information register; and (e) proceeding to step (x) after performing step (d).

10. A decoder of a D-VHS codec system, said decoder comprising:

a sync pattern detector for dividing a preamble, a subcode and a main code of each of tracks of digital data having the format of a train of bits and being read from a tape loaded in a deck, and for detecting sync data in the subcode and the main code, in order to provide both sync-pattern-detected data and information related to a format thereof;

a depacketizer for dividing to store the sync-pattern-detected data from said sync pattern detector in the sync block of unit based on the information related to the format of sync-pattern-detected data from said sync pattern detector, for providing a read data in the sync block of unit and for classifying an ID included in a header of each of the sync blocks, in order to provide a classified ID;

an ID corrector for judging whether or not the classified ID from said depacketizer is damaged, and for providing a corrected ID by executing an error correction of the classified ID when an error occurs;

a descrambler for descrambling the read data in the sync block of unit from said depacketizer by using the corrected ID from said ID corrector as an initial value, and for providing a descrambled data;

a byte aligner for storing on local memory banks both main data sync blocks and subcode sync blocks respectively configured in the format of the track in the descrambled data from said descrambler, and for providing a deformatted sync block data;

a memory for sequentially recording the deformatted sync block data in a relevant track thereof in accordance with a recording control signal in synchronization with a system clock on the basis of an address thereof computed by the value of an ID included in the deformatted sync block data from said byte aligner;

a data controller for allocating a time for each device to access said memory during the recording of data or when receiving a request for reading out data, and for arbitrating data requirements colliding with each other;

a memory controller for providing both a recording/readout address of a memory location and a recording/readout control signal in order to record or read out the data onto/from said memory under the control of said data controller;

a deshuffler for deshuffling the sync blocks for an error correcting coding from the tracks having the sync block data recorded therein when said data controller judges that the sync block data included in a predetermined number of tracks is completely recorded in a relevant track of said memory, and for providing deshuffled sync blocks;

an RS decoder for sequentially executing an inner decoding and an outer decoding in the sync block of unit with respect to the deshuffled sync blocks from said deshuffler, and for providing an error position information and an error magnitude information of each of the sync blocks;

an error information register for sequentially storing in assigned positions both the error position information and the error magnitude information of each of the sync blocks from said RS decoder;

a latch for storing a firstly-read sync block data in an order of the track and the sync block while reading out error-corrected sync block data via said data controller by requesting said data controller to provide the error-corrected sync block data recorded on said memory after the error correction is completed when said data controller judges that a playback stop signal is in an inactive state, and for outputting a secondly-read sync block data;

a dummy filter for excluding dummy sync block data from the secondly-read sync block data from said latch, and for providing only normal sync block data;

a desmoothing buffer for storing the normal sync block data from said dummy filter in synchronization with a switching signal under the control of said data controller;

a time stamp comparator for comparing a time stamp of each of the sync block data with a present reference time stamp data while reading the time stamp of the normal sync block data read out from said desmoothing buffer, and for controlling a point of a data transmission time to a set-top box; and a microcontroller for providing subcode data and system data to said data controller.

11. The decoder of a D-VHS codec system as claimed in claim 10, wherein said memory controller computes the address of said memory corresponding to a relevant track number and a sync block number of a relevant track on the basis of the ID of each of the sync blocks, and records each of the sync block data.

12. The decoder of a D-VHS codec system as claimed in claim 10, wherein said deshuffler deshuffles the sync blocks for the error correcting coding from 6 tracks having the recorded data therein when said data controller judges that the sync block data included in 6 tracks numbered 0 to 5 is completely recorded on said memory.

13. The decoder of a D-VHS codec system as claimed in claim 10, wherein said RS decoder corrects the error in the process of the outer decoding having a correction capability superior to that of the inner decoding after dividing to display the sync blocks incapable of error correction in the process of the inner decoding in order to enhance the capability of the error correction.

14. The decoder of a D-VHS codec system as claimed in claim 10, wherein said error information register comprises an embedded static RAM.

15. The decoder of a D-VHS codec system as claimed in claim 10, wherein said error information register continually executes the error correction of the sync blocks in order to decrease a latency having a time interval equivalent to 2 to 3 sync blocks required for said RS decoder to decode one sync block, and to execute a fast operation.

16. The decoder of a D-VHS codec system as claimed in claim 10, wherein said memory controller computes a relevant address of said memory while reading out the error position information stored on said error information register, and corrects an error in a relevant correction data by a memory write operation.

* * * * *